G. K. DAVOL.
INTERNAL COMBUSTION ENGINE.
APPLICATION FILED FEB. 21, 1910.

1,225,702.

Patented May 8, 1917.
3 SHEETS—SHEET 3.

WITNESSES:
Leonard W. Noauder
George E. Higham.

INVENTOR.
George K. Davol
BY
ATTORNEYS

UNITED STATES PATENT OFFICE

GEORGE K. DAVOL, OF SAN FRANCISCO, CALIFORNIA.

INTERNAL-COMBUSTION ENGINE.

1,225,702.  Specification of Letters Patent.  Patented May 8, 1917.

Application filed February 21, 1910. Serial No. 545,029.

*To all whom it may concern:*

Be it known that I, GEORGE K. DAVOL, a citizen of the United States, residing in the city and county of San Francisco, in the State of California, have invented a new and useful Form of Internal-Combustion Engine, of which the following forms a specification.

My invention relates to an improved means for lubricating and cooling internal combustion engines.

Two of the greatest sources of difficulty and trouble in internal combustion engines of the ordinary type, lie in the necessity for cooling and lubricating the cylinder walls.

Ordinarily the cylinder walls are kept cool by water jackets surrounding them and lubricated by the use of the special oils.

In large engines having cylinders with very thick walls the water jackets become less effective, while the lubrication of internal combustion engine cylinders by means of oil, gives rise, owing to the high temperatures, to many troubles and difficulties which it is not necessary to here enlarge upon. Especially are such troubles encountered when the utilization of dusty or very impure gases is attempted.

My invention is intended to provide an internal combustion engine in which the working piston does not touch the walls of the cylinder in which it reciprocates, but is separated therefrom by a very minute annular space.

In order to make the piston "tight," or prevent the escape of gases through this annular space, water is introduced between the cylinder walls and piston, filling the annular space and preventing the egress of gases before the water itself has been expelled.

The water so introduced is intended to also serve as a cooling medium, to keep the temperature of the cylinder walls and piston within proper limits.

The water being introduced on the inside of the cylinder walls and in actual contact with the piston, performs its cooling functions most effectively.

I am aware that internal combustion engines have been constructed in which the surface of a body of water is presented to the burning charge, and made to receive the pressure of the working gases and transmit the pressure to a plunger or piston.

In the engine embodying my invention, however, the water is not used to transmit the pressure of the working gases to the piston, but the gases act directly on the piston, and the water is only used for cooling and packing purposes, or to prevent the escape of the gases, and in connection with a piston or plunger which does not touch the walls of the cylinder in which it reciprocates.

As the piston does not touch the walls of the cylinder in which it reciprocates, it must be very accurately guided; and the means employed to guide the piston, as well as a design which shall permit, under practical conditions of the necessary accuracy of construction become of great importance.

In this engine, the most impure and dusty gases, crude oils and pulverized fuels, may be used without trouble arising from cylinder lubrication.

In the accompanying drawings.

All parts shown in the various views are designated by the same reference numbers in all the views.

Figure 1:
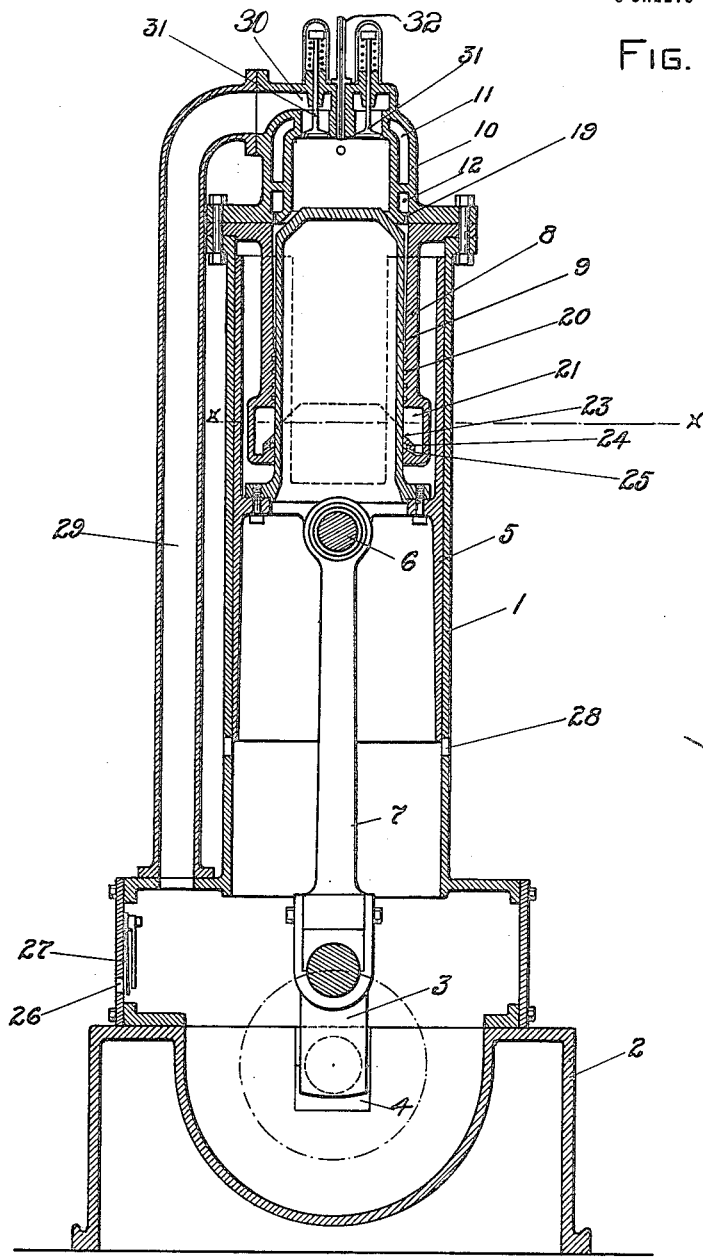
Figure 1 shows a vertical section taken on the center line of the engine, the plane of the section being at right angles to the crank shaft.

Referring to the various drawings, 1 is the main frame of the engine which is mounted on the bed plate 2, which carries the crank shaft 3 in the bearings 4.

The frame 1, which I shall also term a guide cylinder, is bored throughout the greater portion of its length very accurately and forms a cylindrical guide or slide, in which reciprocates a slide or piston guide 5.

The piston guide 5 is accurately finished to fit within the guide cylinder with but very little clearance.

The piston guide 5 carries the wrist pin 6 which is connected to the crank pin of the shaft 3 by means of the connecting rod 7.

The working cylinder 8 is accurately centered within the guide cylinder 1 and is attached thereto by a flange at its upper end.

The working piston 9 is attached to the piston guide 5 by a flange at its lower end and is accurately centered within the piston guide.

Figure 2:
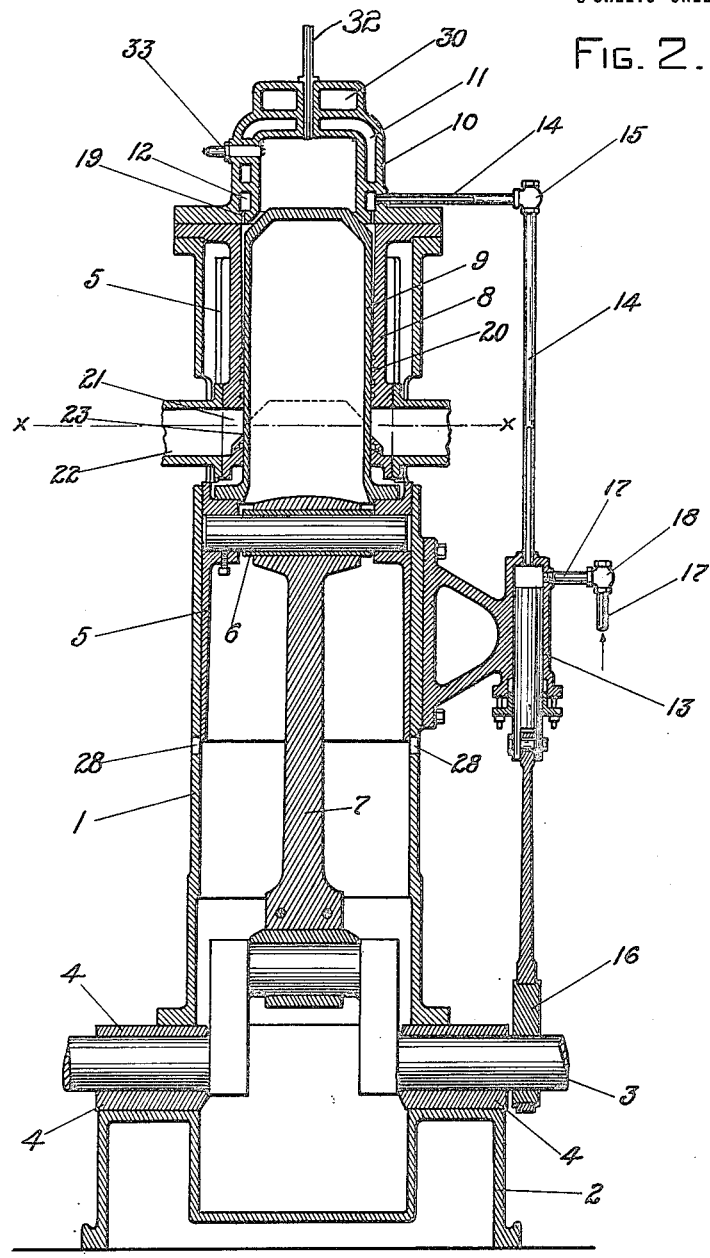
Fig. 2 shows a vertical section taken on the center line of the engine at right angles to the sectional view shown in Fig. 1.
Figure 3:
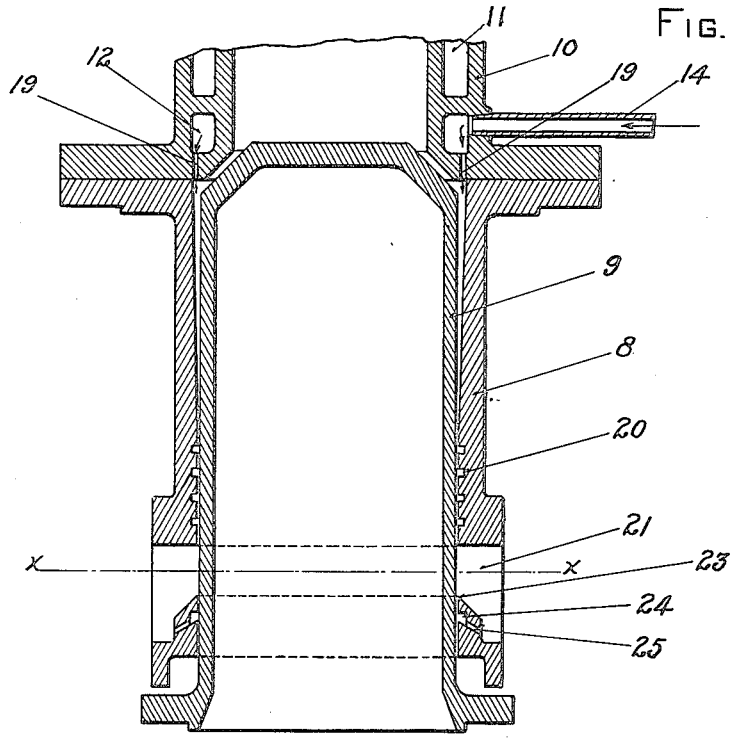
Fig. 3 shows an enlarged vertical sectional view of the piston, cylinder, and a portion of the cylinder head, the view being taken on the same sectional plane as that of Fig. 2.

As seen in the Figs. 1 and 2 the piston 9 enters and reciprocates within the cylinder 8, but is made of slightly less diameter than the inside diameter of the cylinder, and being guided and held by the piston guide 5, does not touch the cylinder, but is separated therefrom by a minute annular space, which space is too small to be shown in Figs. 1 and 2, while in Fig. 3 the space is shown and is somewhat exaggerated in order to make it apparent.

The piston guide 5, it is seen extends up almost as high as the end of the piston 9, which is important, for if the piston 9 extended up much higher than the piston guide, then any slight lateral movement permitted the end of the piston guide 5 would be allowed the extended upper end of the piston 9 to an increased or multiplied extent, so that it could not be guided so accurately.

The piston guide 5 is therefore made long and is made to almost wholly embrace or cover the whole length of the piston 9. This necessitates the construction shown, of having the upper end of the piston guide partially surround the cylinder 8 at the upper end of the stroke.

Above the cylinder, is the cylinder head 10 which is held in place by bolts which pass through its lower flange and through the flanges of the cylinder 8 and guide cylinder or frame 1, holding them all in proper relative positions.

The cylinder head has a water jacket 11 for cooling purposes, and also an annular water passage 12 through which the packing and cooling water is supplied to the cylinder.

This water passage 12 is connected with a pump 13, Fig. 2, by means of the pipes 14 and check valve 15.

The pump 13, which is operated from the eccentric 16 draws water through the suction pipe 17 and check valve 18 and forces it at each revolution of the crank shaft into the water passage 12 in the cylinder head. To simplify the drawing the check valves are not shown in section.

From the annular water passage 12 the water is forced into the cylinder and against the cylinder walls through a number of small holes or nozzles 19, Figs. 1, 2 and 3.

It will be seen that the upper end of the cylinder 8 is recessed or counterbored, so that at the upper end of the cylinder there is an increased annular space between the cylinder and piston when the piston is at the top of its stroke.

This counterbore may be made cylindrical with straight sides or conical. The conical form is shown in the drawings.

The holes 19 are drilled on a circle so that their edges come flush with the edge of the counterbore so that the issuing jets of water come immediately in contact with the walls of the cylinder or counterbore.

The packing and cooling water supplied by the pump 13 is, as before stated, forced into the cylinder and against the cylinder walls at each revolution and this injection of water is probably best effected if done during the compression or upward stroke of the piston.

The water issuing from the small holes 19 rushes down along the cylinder walls and as the piston rises, fills the annular space between piston and cylinder and accumulates in the enlargement of the annular space at the upper end of the cylinder. This water under the pressure of compression and afterward under the pressure of the working stroke, is, of course, continuously escaping at the lower end of the cylinder, but the annular space through which it must escape is so small that the amount so lost does not constitute a serious loss of pressure or work.

To further obstruct the escape of water at the lower end of the cylinder a number of grooves 20 are formed in the cylinder walls and the eddying effect produced by these grooves appreciably reduces the amount of water lost.

It will be seen that the head of the piston is shaped with its edges beveled off at an angle, which in the figures is approximately 45°. This shape is given the piston so that on its rising stroke any water meeting the piston is, through the inertia of the water and the speed of the piston, thrown off against the cylinder walls or into the annular space between cylinder and piston. It will be seen that if the end of the piston was finished off straight across, without such beveled edges, then water might be caught on the top of the piston and projected into the compression space above the piston at the top of the stroke.

At the lower end of the cylinder is formed an exhaust passage 21, Figs. 1, 2 and 3, which exhaust passage or port the piston 9 overruns or uncovers at the lower end of its stroke, permitting the free egress of gases and water from the cylinder.

The position of the top of the piston at the lower end of its stroke is shown in dotted lines in Figs. 1 and 2.

Below the exhaust passage 21 the cylinder walls again closely approach the piston and are intended to prevent the escape of exhaust gases and water except through the openings 22, Fig. 2, which connect at each side with the exhaust port.

To more effectively "wipe" water from the piston and prevent its escape except through the exhaust passages provided, the lower edge of the exhaust port 21 is made sloping down and away from the piston forming a sharp upper edge 23.

An additional groove 24 is formed in the cylinder wall below this edge and is connected with the exhaust passage by small inclined passages 25, see Fig. 3.

This groove is designed to catch water adhering to the piston and lead it into the exhaust. A number of such grooves may be employed if desired.

Figure 4:
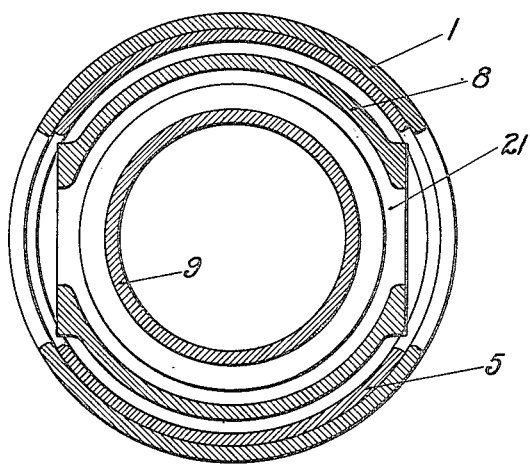
Fig. 4 shows a horizontal section taken on line x—x Figs. 1, 2 and 3.

The exhaust passages 22 connecting at each side with the exhaust port pass out through openings found in the walls of the guide cylinder or frame 1, as shown in Figs. 2 and 4.

It is also seen that the upper part of the piston guide is recessed or cut away at each side, in order to clear these exhaust passages at the upper end of the stroke. The manner in which the piston guide is so cut away is shown in dotted lines in Fig. 1 and is also shown in section in Fig. 4.

The form of engine illustrated in the drawings and so far described as embodying my invention is a "two-cycle" engine, in which the charge of air is first drawn into the crank case, by the upward stroke of the piston and piston guide, through the opening 26 which is covered on the inside by the flap valve 27, Fig. 1. At the top of the stroke the inlet ports 28 are uncovered by the edge of the piston guide and additional air may so enter the crank case.

On the downward stroke the air so entrapped in the crank case is lightly compressed by the descending piston guide and piston and fills the air passage 29 leading to the cylinder head 10 and valve chamber 30.

When the exhaust port 21 is uncovered by the piston at the lower end of its stroke the pressure within the cylinder is released and falls to that of the atmosphere. Then the pressure of the lightly compressed air in the crank chamber and above the automatic inlet valves 31 in the cylinder head causes the said inlet valves to open and the lightly compressed air charge flows through from the crank chamber and passage 29 into the cylinder.

On the upward stroke the valves 31 automatically close and the charge in the cylinder is compressed.

Fuel may be added to the air charge in the form of gas at any convenient point, within the crank chamber, or within the passage 29, or it may be directly injected into the cylinder through the pipe 32 in the cylinder head, at any suitable time during the compression stroke or afterward.

Liquid fuel or pulverized solid fuel may be similarly injected.

I have not considered it necessary to show any injecting apparatus for this purpose as that is a feature which does not essentially bear upon my invention.

Ignition is accomplished in the usual way as by a spark plug 33 shown in Fig. 2.

Having now described my invention as embodied in an engine working on the two stroke cycle, I will say that it is applicable to an engine working on the four stroke cycle with certain additions of parts which do not directly bear upon the invention.

I consider, however, that my invention can be embodied with particular advantage in an engine operating on the two stroke cycle.

The manner in which the packing and cooling water is supplied to the space between the cylinder and piston is not confined to that shown in the drawings and just described.

The water may, if desired, be supplied in a continuous stream, and not intermittently as by the action of a pump such as shown and described. It may be supplied from any suitable source either continuously or intermittently.

The essential requirements are that the piston be guided within the cylinder so that it shall not designedly touch the walls of the cylinder, but shall be separated therefrom by an annular space, and that this annular space be supplied with water, in order to hold back or retard the escape of gases through the said space, and that sufficient water be supplied to the inside surface of the cylinder to effect the required cooling.

For the cylinder and piston which will be subject to the corrosive action of the water, suitable special materials should be used which are non-corrosive. Nickel steel carrying a high percentage of nickel, certain bronzes, or the metal known as "Monel metal" being an alloy of copper and nickel, would be suitable.

The engine embodying my invention can be most advantageously made of the vertical type, as in a vertical engine the draining of the water from the cylinder is easily accomplished. It is, however, not an absolutely necessary requirement that the engine be made vertical. A slight inclination from the vertical would have very little effect. In the claims the use of the word vertical is intended to mean substantially vertical, and to cover any small inclination or deviation from the vertical.

For ease or practicability of manufacture, and practicability of operation, the working cylinder is accurately concentric with the guide cylinder, and the working piston concentric with the piston guide, and these parts are referred to as being so concentric in the claims. A slight departure from this concentric arrangement, however, would not affect the essence of my invention and is intended to be covered by my design and invention.

In the specification and in the claims which follow, I have used the term "an annular space" to describe the clearance between the piston and the cylinder, and have further used the term "free" to describe this clearance.

I wish to make it clear that although I consider these terms strictly correct as defining the clearance or space, which is purposely and carefully provided for, still it must be understood that this space or clearance may be extremely small. I endeavor to provide a free clearance between the piston and the cylinder, and to avoid actual contact, and still keep this clearance very small. With accurate workmanship the necessary conditions can be fulfilled, and the piston and the cylinder be kept out of contact. This clearance between the piston and the cylinder walls, when the piston is exactly centered within the cylinder, should preferably be less than ten thousandths of an inch in an engine having a piston twelve inches in diameter.

The term "cylinder" or "working cylinder" as commonly understood and used in the specifications and in the following claims is intended to designate that part in which the piston reciprocates and which maintains with the piston gas tight relations, resisting the pressure of the working gases and acting to confine them against escape, and forming with the piston a gas tight chamber of variable volume, which may or may not be of circular cross section.

Inasmuch, therefore, as the cylinder, in the strict and proper sense, constitutes only that part which resists the pressure of the working gases and maintains with the piston substantially gas tight relations, it will be understood that that part encircling the piston below the exhaust port 21, which has hereinbefore been referred to as part of the cylinder walls, although associated with the working cylinder, and in the construction shown in Figs. 1, 2 and 3 being actually formed of the same casting, is not required to resist the working pressure of the gases and does not in the proper sense which is intended and explained above, form part of the working cylinder. It must, therefore, be recognized that the part referred to, which is separated from the cylinder by the open exhaust passage and the principal function of which is to confine the exhaust gases, could, if desired, be allowed to be in sliding contact with the piston, without it being considered a contact between the piston and the working cylinder. In my preferred arrangement as shown in Fig. 3 this part does not touch the piston but is separated therefrom by the same clearance that separates the piston from the cylinder proper.

It is to be understood that the grooves 20 shown herein as formed in the cylinder constitute a labyrinth packing, provided to retard the flow of water between the piston and the cylinder, and that substantially the same effect is produced whether the grooves be formed in the piston or in the cylinder, as a result of which I desire to claim any such arrangement of labyrinth packing equivalent to that shown for securing the result referred to.

I desire to make it clear that in these specifications and claims, the term "water" is intended to mean water, or an equivalent liquid. I prefer pure water, but my invention is intended to cover any other suitable liquid or solution or emulsion, which either through design or necessity may be used.

It is to be understood that while I have shown my invention as applied to a two cycle engine, in which the exhaust port is controlled directly by the engine piston, I do not limit myself to this particular construction, but may employ other types of engine and other valve mechanisms without departing from the spirit of my invention.

What I claim is:

1. In an internal combustion engine, the combination of a cylinder in which expansion of the working gases takes place, a piston guided to reciprocate within but not in contact with the said cylinder being separated therefrom by an annular clearance, the said clearance being open or unconfined at the open or crank end of the cylinder, and means for supplying water to the said clearance.

2. In an internal combustion engine, the combination of a cylinder in which expansion of the working gases takes place, a piston guided by means external to the said cylinder to reciprocate within but not in contact with the walls of the said cylinder, said piston being separated from said cylinder by a free annular space open or unconfined at the open or crank end of the cylinder, and means for introducing water into said annular space.

3. In an internal combustion engine, the combination of a working cylinder, a piston guided to reciprocate within but not in contact with the walls of said cylinder being separated therefrom by a free annular space, said annular space opening freely at its outer end to an exhaust passage, and means for introducing water into the said annular space.

4. In an internal combustion engine, the combination of a cylinder in which expansion of the working gases takes place, a piston guided by means external to the said cylinder to reciprocate within but out of contact with the walls of the said cylinder being separated therefrom by an annular clearance, the said clearance opening at its outer end to an exhaust passage, and means for introducing water into the said annular clearance.

5. In an internal combustion engine the combination of a cylinder in which expansion of the working gases takes place, a piston guided to reciprocate within but not in contact with the said cylinder being separated therefrom by a free annular space, means for introducing water into the said annular space, and a plurality of substantially parallel unconnected grooves between the piston and cylinder for receiving said water and producing eddy currents therein.

6. In an internal combustion engine, the combination of a cylinder in which expansion of the working gases takes place, a piston guided to reciprocate within but not in contact with the said cylinder being separated therefrom by a free annular space, means for supplying water to the said annular space, and an annular exhaust port into which the said annular space opens.

7. In an internal combustion engine the combination of a cylinder in which expansion of the working gases takes place, a piston guided to reciprocate within but not in contact with the said cylinder being separated therefrom by a free annular space, means for introducing water into the said annular space, and an annular exhaust or relief port formed at one end of said cylinder, said port being opened and closed by the movement of the said piston.

8. In an internal combustion engine, the combination of a cylinder in which expansion of the working gases takes place, a piston guided to reciprocate within but separated from said cylinder by a free annular space, said cylinder having an exhaust or relief port or ports at one end, said port or ports being opened and closed by the movement of the said piston, and means for introducing water into the cylinder at the other end.

9. In an internal combustion engine, the combination of a substantially vertical cylinder, a piston guided to reciprocate in said cylinder and separated from the inside surface thereof by an annular space, an annular exhaust port formed at the lower end of the cylinder, and means for introducing water into said cylinder at its upper end and against the inside walls thereof.

10. In an internal combustion engine, the combination of a cylinder in which expansion of the working gases takes place, a piston guided to reciprocate within but separated from the said cylinder by a free annular space, and means for introducing water into one end of the said annular space, and delivering it from the other end of said space at each stroke of the engine.

11. In an internal combustion engine the combination of a cylinder in which expansion of the working gases takes place, a piston guided to reciprocate within but separated from the cylinder by an annular space, said cylinder having an annular water collar at its inner end provided with a plurality of separate outlet openings to direct issuing jets of water onto the inside surface of said cylinder, and means for supplying water to said annular collar.

12. In an internal combustion engine, the combination of a cylinder, a working piston reciprocating within but separated from said cylinder by a free annular space, means for sealing the said annular space with water, a cylindrical piston guide of larger diameter than said working piston, and a guide cylinder adapted to hold and guide said piston guide and piston, the space above the said piston guide being in open communication with the atmosphere.

13. In an internal combustion engine the combination of a guide cylinder, a working cylinder concentric within said guide cylinder, said cylinders being joined at their upper ends, a piston guide sliding within said guide cylinder and reciprocating at its upper end within the space between said cylinders, a working piston attached to and guided by said piston guide, said working piston reciprocating within said working cylinder and separated therefrom by a free annular space, and means for supplying water into the said annular space.

14. In an internal combustion engine, the combination of a guide cylinder, a working cylinder in which expansion of the working gases takes place, said cylinders being joined at one end and the working cylinder concentrically disposed within the guide cylinder, a cylindrical piston guide, a piston attached to and concentrically disposed within the piston guide, said piston guide reciprocable within and in sliding contact with the guide cylinder, and said piston reciprocable within said working cylinder and out of contact therewith, and means for introducing water into the space separating the said working piston and working cylinder.

15. In an internal combustion engine, the combination of a guide cylinder, a working cylinder concentrically disposed within the said guide cylinder, the said working cylinder having an exhaust port or ports in its walls and an outlet passage or passages leading laterally from said working cylinder through the walls of said guide cylinder, a piston guide reciprocating within said guide cylinder, and a working piston attached to said piston guide and reciprocating within but not in contact with said working cylinder, said piston guide reciprocating within the space between said cylinders and cut away to clear said outlet passage or passages.

16. In a two stroke internal combustion engine the combination of a guide cylinder, a working cylinder concentrically disposed within said guide cylinder, a cylindical piston guide fitting and reciprocating within and in sliding contact with said guide cylinder, a working piston of smaller diameter than and attached to said piston guide and reciprocating within and separated by an annular space from said working cylinder, means for introducing water into the said annular space, and a closed crank case opening into said guide cylinder, said piston guide being adapted to draw in and compress air or gaseous charge within the said crank case.

17. In an internal combustion engine, the combination of a cylinder in which combustion and expansion of the working gases takes place, a piston guided to reciprocate within but not in contact with the walls of the said cylinder being separated therefrom by a free annular space, the said space opening at its outer end to the atmosphere or exhaust, and means for introducing water into the said annular space to cool the said parts and prevent the egress of the working gases.

18. An internal combustion engine having in combination, a piston, a combustion chamber unprovided with packing, in which chamber the piston reciprocates, guides exterior to said chamber for guiding the piston therein, an exhaust port, the piston having a diameter only sufficiently smaller than the diameter of the encircling walls to provide a water seal between the combustion chamber and exhaust port, and means to supply water between the piston and the walls.

19. In an internal combustion engine, a working cylinder, a piston movable within said cylinder, but of a diameter substantially smaller than said cylinder so that said piston and cylinder are out of contact, said piston being unprovided with packing ring, a water seal between said cylinder and said piston, a restricted annular space being formed between said piston and the bottom of said cylinder, in which said annular space said water seal is maintained.

In witness whereof, I hereunto subscribe my name this 16th day of February, A. D. 1910.

GEORGE K. DAVOL.

Witnesses:
JOHN HAMILTON,
MILDRED SCHINNELLER.